United States Patent [19]
Johns et al.

[11] Patent Number: 6,061,069
[45] Date of Patent: May 9, 2000

[54] APPARATUS AND METHOD OF PERFORMING SCREEN TO SCREEN BLITS IN A COLOR SLICED FRAME BUFFER ARCHITECTURE

[75] Inventors: Charles Ray Johns; Christopher Mark LeBlanc; Richard Jesse Mitchell; John Thomas Roberson, all of Austin, Tex.

[73] Assignee: International Business Machines Corporation, Armonk, N.Y.

[21] Appl. No.: 08/687,854

[22] Filed: Jul. 26, 1996

[51] Int. Cl.⁷ .................................................. G06T 11/00

[52] U.S. Cl. ............................ 345/435; 345/429; 395/510

[58] Field of Search ............................ 395/510; 345/435, 345/150, 153, 154, 155, 511, 518, 402, 427, 429, 329, 333–335

[56] References Cited

U.S. PATENT DOCUMENTS

| | | | |
|---|---|---|---|
| 4,564,915 | 1/1986 | Evans et al. | 364/521 |
| 5,543,824 | 8/1996 | Priem et al. | 345/201 |
| 5,600,773 | 2/1997 | Vanover et al. | 395/173 |
| 5,724,560 | 3/1998 | Johns et al. | 395/510 |
| 5,790,125 | 8/1998 | Bui et al. | 345/435 |

*Primary Examiner*—Matthew Luu
*Assistant Examiner*—Jeff Piziali
*Attorney, Agent, or Firm*—Volel Emile

[57] ABSTRACT

A method and apparatus for moving pixel data from one area of a frame buffer to another in block fashion are provided. In one embodiment of the invention, pixel data is decomposed into its RGB component and each RGB component is stored into the frame buffer in a particular memory bank. The pixel data is moved by moving all the components of the data stored in a memory bank before moving the components in other memory banks.

18 Claims, 3 Drawing Sheets

APPARATUS AND METHOD OF PERFORMING SCREEN TO SCREEN BLITS IN A COLOR SLICED FRAME BUFFER ARCHITECTURE

BACKGROUND OF THE INVENTION

1. Field of the Invention

The present invention relates generally to computer graphics systems and, more particularly, to a method of providing efficient screen to screen block image transfer operations in a graphics subsystem having a sliced frame buffer architecture.

2. Description of the Related Art

In the computer graphics field, many types of graphics subsystems are utilized. Typically, however, such subsystems provide for a frame buffer to store pixel data to be eventually displayed on a screen. The frame buffer is made up of a displayable and a non-displayable memory portion. The displayable memory portion of the frame buffer is usually an exact mapping of the display screen. That is, each storage location in the displayable portion corresponds to a display location or pixel on the screen.

When moving pixels from one area of the screen to another, block image transfer (BLIT) is most often utilized. BLIT operations include moving blocks or lines of pixels from one location of the displayable portion of the frame buffer to another. The implementation of a screen to screen BLIT operation is well-known in the art and thus, is not explained.

In application Ser. No. 08/572,697, filed on Dec. 14, 1995, which has issued as U.S. pat. No. 5,724,560, assigned to Internal Business Machines Corporation, the disclosure of which is hereby incorporated by reference, a novel method of rendering pixel data from a graphics subsystem's processor(s) to a frame buffer was disclosed. The method entailed decomposing (or slicing) each pixel data into its RGB color components before transferring the data to the frame buffer. The frame buffer itself was divided or sliced into three memory banks, each bank being used to store one of the three color components of each pixel. Each color component of the pixels was assembled and rendered together. For example, using a 32-bit bus to render 24-bit pixel data to the frame buffer, each pixel data would first be decomposed into eight bits of red, eight bits of green and eight bits of blue data. All the bits representing the red components of the pixels were assembled and transferred to the red memory bank of the frame buffer. So were the bits representing the green and the blue components assembled and transferred to the green and blue memory banks, respectively. This rendering method allowed all 32 bits of the bus width to be effectively used at each bus cycle since the transferred data was packed in blocks of eight bits. In contradistinction, rendering a whole pixel at a time only allowed 24 bits (or ¾) of the bus width to be used at each bus cycle. Hence, a marked increase in speed was achieved. Furthermore, in this configuration only one bus was used to link the three memory banks to the subsystem's processor (s). Therefore, a savings in chip's cost and real estate was realized while augmenting the efficiency of the subsystem.

However, when a screen to screen BLIT operation was performed in the sliced frame buffer architecture, each pixel was moved one component at a time. This involved reading a particular component of the pixel's RGB data from one location of a memory bank and writing it into another location, disconnect the data bus from the memory bank from which the component was read and connect the data bus to another memory bank to allow the next RGB component of the pixel to be moved. Thus, moving a block or a line of pixels from one area of a screen to another required that a bus cycle be spent disconnecting/connecting the data bus to a different memory bank after each component of a pixel was moved. Hence, the number of disconnecting/reconnecting cycles depended on both the number of memory banks in a frame buffer and the number of pixels being moved. Consequently, a screen to screen BLIT often times was quite a time intensive operation.

Thus, there is a need in the art for an apparatus and method of decreasing the time required to perform a BLIT operation in a sliced frame buffer architecture.

SUMMARY OF THE INVENTION

The need in the art is addressed by the present invention. The present invention provides a method and apparatus for moving pixel data from one area of a sliced frame buffer by moving common components of the pixel data at a time. In an embodiment of the invention, the pixels are decomposed into their RGB components. The frame buffer is divided into a plurality of memory banks, each memory bank being used to store a respective RGB component of the pixels. The pixel data is moved from one location of the frame buffer to another by moving all the RGB components of the pixels stored in a memory bank before moving the components in the other memory banks. Thus, the number of bus cycles spent disconnecting/connecting the data bus to the memory banks is greatly diminished as it is equal to the number of memory banks in the frame buffer.

DESCRIPTION OF THE INVENTION

Figure 1:
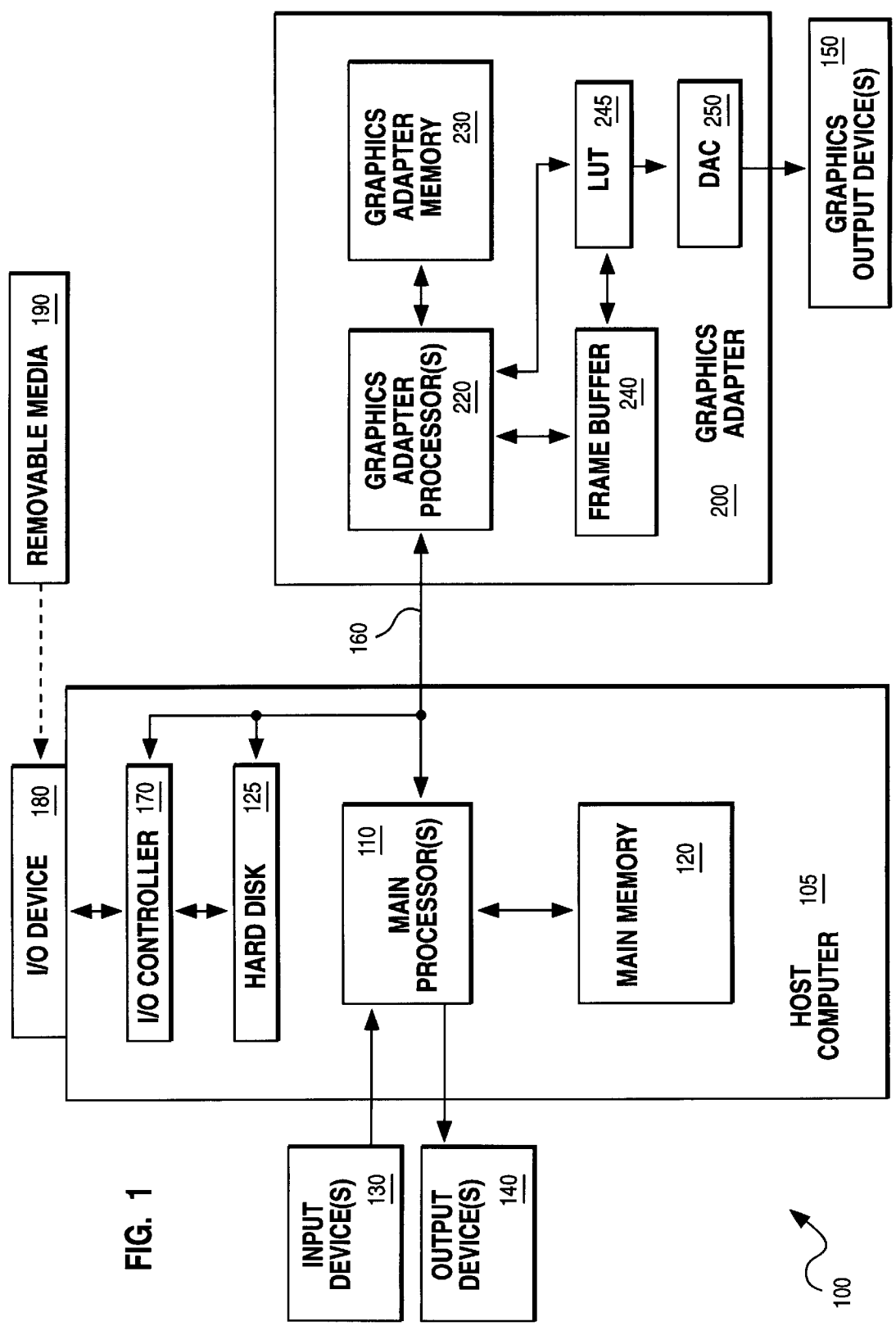
FIG. 1 is a block diagram of a digital computer system employed in a preferred embodiment of the invention.

FIG. 1 is a block diagram of a digital computer system 100 employed in a preferred embodiment of the invention. Such computer may take the form of a workstation such as the RISC-based systems marketed by the IBM Corporation, although the invention is not intended to be so limited and is equally applicable to essentially any computer system employing a graphics subsystem for purposes of displaying graphics information.

Still referring to FIG. 1, the computer includes one or more main processors 110, coupled to a main memory 120, and a hard disk 125 of the host computer 105. Conventional input and output devices 130 and 140, respectively, are attached to the host. Such input devices may include a keyboard, mouse, tablet, or other types of input devices. Output device(s) 140, may include a text monitor, plotter, or other well known output devices. A computer readable removable media 190, such as a familiar diskette or compact disk, may be inserted into the input/output device 180, such as a disk drive or CD ROM drive. Data is read from or written to the removable media by I/O device 180 under control of the I/O device controller 170. The I/O device controller communicates with the main processor(s) through a bus 160. Main memory 120, hard disk 125, and removable media 190 are all referred to as "memory" for storing data for processing by main processor(s) 110.

The main processor 110 is also coupled to a suitable graphics output device(s) 150, such as a graphics display through a graphics subsystem which, in a typical embodiment, may be comprised of a graphics adapter 200 or other appropriate graphics subsystem form function. The graphics adapter 200 receives instructions regarding graphics from the main processor 110 on bus 160. The graphics adapter then executes these instructions with a graphics adapter processor(s) 220, coupled to a graphics adapter memory 230. It will be noted that this graphics adapter memory 230 is often associated with higher-end graphics subsystems providing enhanced graphics functionality, and that in other systems, necessity for such dedicated graphics adapter memory 230 may be obviated. The graphics processors 220 in the graphics adapter are essentially the graphics rendering engine which executes the instructions received over the bus from the main processor and, as a result, updates one or more frame buffers 240 based on execution of those instructions. The frame buffers 240 are essentially video random access memory (VRAM) with fast access time. They are used to store data for every pixel to be displayed on the graphics output device, with a look-up table (LUT) 245, containing a palette of colors referenced by the data in the frame buffer 240. A DAC (digital-to-analog converter) 250 converts the digital data stored in the frame buffer(s) into appropriate signals such as the familiar "RGB" video signals, which are then provided to the graphics display 150, thereby resulting in the visual display of the desired graphics output from the main processor. Conventionally, the LUT 245 and DAC 250 comprise a random-access-memory digital-to-analog convertor or "RAMDAC".

Figure 2:
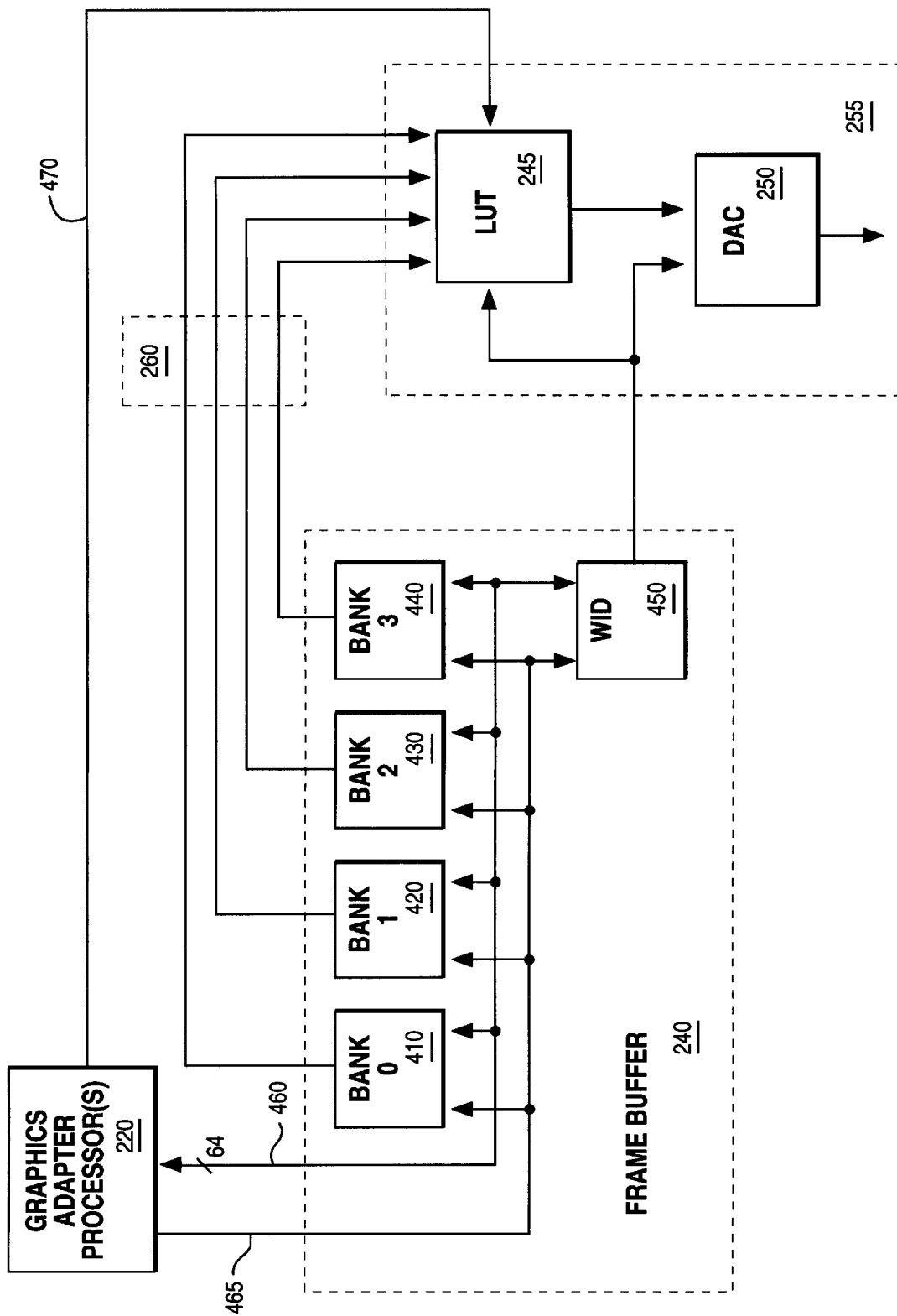
FIG. 2 is a detailed block diagram of portions of a graphics adapter 200 used in a preferred embodiment of the invention.

Turning now to FIG. 2, as previously noted the present invention is desirably implemented in a preferred embodiment in conjunction with a graphics adapter 200 shown in FIG. 1. FIG. 2 is a detailed block diagram of portions of the graphics adapter 200 described above with reference to FIG. 1. These portions of the graphics adapter 200 comprise a graphics processor(s) 220, frame buffer memory 240, and RAMDAC 255. The frame buffer 240, in a typical embodiment, will further include multiple memory banks such as banks 0–3 (reference numerals 410–440, respectively, which will be referred to hereinafter as memory banks 0–3). Also included in the frame buffer preferably is a window identifier memory (WID) 450. The graphics processor 220 is connected to the memory banks 0–3 and the WID 450 of the frame buffer 240 by an appropriate interface bus 460 and pixel address bus 465. The memory banks are used for storing pixel data to be displayed on the screen of the graphics output device 150. The pixel data is updated by the graphics processor via the bus interface 460, based upon addresses provided across the pixel address bus 465.

The graphics processor 220, the memory banks 0, 1, 2 and 3 and the wid 450 are all connected to RAMDAC 255. The graphics processor 220 updates the palette of colors in the LUT 245 via control bus 470. The pixel data stored in memory banks 0–3 are transferred to RAMDAC 255 in parallel over memory bus 260. The wid 450 and the frame buffer 240 are identically mapped. That is, each location in the wid 450 corresponds to a pixel location in the frame buffer 240. The wid 450 generates a code that is used by RAMDAC 255 to determine the attributes of the corresponding pixel. The RAMDAC 255 uses these attributes to select the memory bank from which to obtain the data for a particular pixel and how to interpret the data.

Figure 3:
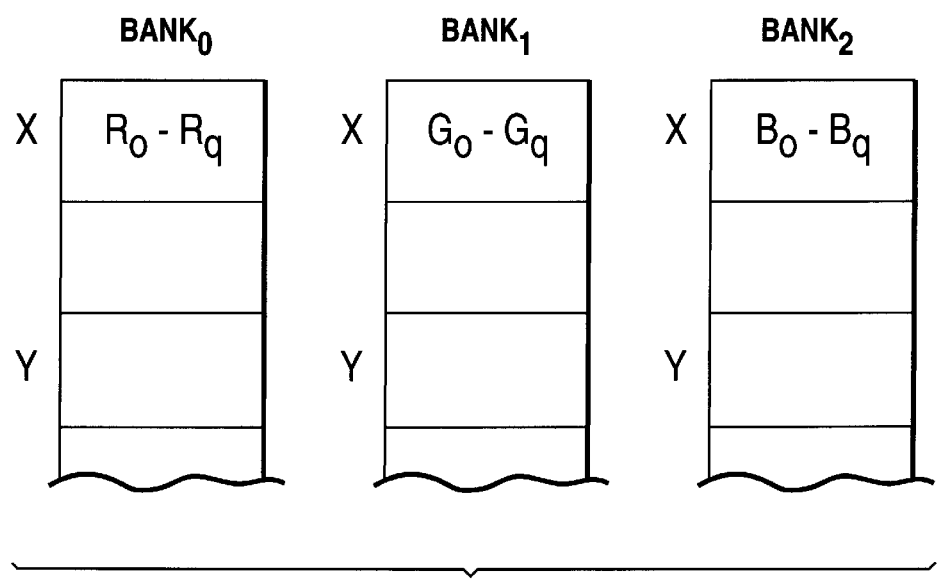
FIG. 3 depicts the storage of pixel data within a frame buffer memory banks.

FIG. 3 depicts how pixel data are stored in the frame buffer memory banks. As described in application Ser. No. 08/572,697, now U.S. Pat. No. 5,724,560 the graphics processor(s) 220 decomposes the pixels into their RGB components before rendering them to the frame buffer over interface bus 460. Each one of the RGB components of the pixels is stored into a particular memory bank. For instance, the red components of the pixels are stored in bank 0 whereas the green components are stored in bank 1 while the blue components are stored in bank 2. Bank 3 is usually used to store $\alpha$ values when they are available. The a values are typically used to represent pixel's transparency, although at times they are used to provide other information such as stencil plane, color, intensity etc. Only banks 0–2 are shown in FIG. 3; however, it should be obvious that the invention will equally apply to frame buffers having more than three memory banks. Indeed, as can be deduced from the example below, the greater the number of memory banks in the frame buffer the more time efficient the graphics subsystem becomes when using the present invention to effectuate screen to screen BLIT operations.

Conventionally, the ten pixels shown in FIG. 3 at location X of the frame buffer were transferred to location Y by moving an RCB component of a pixel at a time. For example, during a first bus cycle $R_0$ was read from location X and was written into location Y of bank 0 during a second bus cycle. Then, interface bus 460 was disconnected from bank 0 and connected to bank 1 during a third bus cycle to allow for the transfer of the green components of $pixel_0$. Once connected to bank 1, $G_0$ was read from location X and written into location Y in two successive bus cycles. Then after disconnection from bank 1 and connection to bank 2 of the bus 460, $B_0$ was transferred from location X to location Y of bank 2. This process would continue until all ten pixels were transferred to location Y. Thus, moving the ten pixels from location X to location Y required 90 bus cycles (i.e., 10 read cycles, 10 write cycles and 10 disconnect/reconnect cycles for each of the banks 0, 1 and 2).

This novel implementation proposes moving the red components of all the pixels participating in the screen to screen BLIT in bank 0 in succession before disconnecting the data bus from bank 0. Upon connection of the bus to bank 1, all the green components of the pixels are transferred successively before the bus is connected to bank 2, and so on. Consequently, after each 20 bus cycles (i.e., 10 read and 10 write cycles), a cycle will be spent disconnecting/reconnecting the bus to a different memory bank. Hence, the 30 disconnect/reconnect bus cycles of the prior art are replaced with only 3 cycles. Hence, this novel method of screen to screen BLIT operation provides a great savings in time when performing a BLIT operation in a color sliced frame buffer.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. An apparatus for moving data comprising:
   means for dividing groups of data into their components;
   means for storing common components of said groups of data into portions of a memory device; and
   means for moving said groups of data from one area of said memory device to another by moving all of one common component of said groups of data before moving other components of said groups of data.

2. The apparatus of claim 1 wherein said apparatus is a graphics display adapter and said groups of data are pixel data.

3. The apparatus of claim 2 wherein said means of dividing includes dividing said pixel data into RGB component data.

4. The apparatus of claim 3 wherein said memory device is a frame buffer and said portions are memory banks, each memory bank for storing a component of the RGB component data.

5. The apparatus of claim 4 further comprising a data bus, said data bus being disconnected from a first memory bank and reconnected to a second memory bank after moving all RGB components stored in said first memory bank.

6. A method of moving data comprising:

dividing groups of data into their components;

storing common components of said groups of data into portions of a memory device; and moving said groups of data from one area of said memory device to another by moving all of one common component of said groups of data before moving other common components of said groups of data.

7. The method of claim 6 wherein said groups of data are pixel data.

8. The method of claim 7 wherein said step of dividing includes the step of dividing said pixel data into its RGB component data.

9. The method of claim 8 wherein said memory device is a frame buffer and said portions are memory banks, each memory bank for storing a component of the RGB component data.

10. The method of claim 9 further comprising the step of disconnecting a data bus from a first memory bank and reconnecting said data bus to a second memory bank after moving all RGB components stored in said first memory bank.

11. A display apparatus comprising:

a host computer;

a graphics adapter coupled to said host computer including:

means for dividing groups of data into their components;

means for storing common components of said groups of data into portions of a memory device; and means for moving said groups of data from one area of said memory device to another by moving all of one common component of said groups of data before moving other common components of said groups of data.

12. The apparatus of claim 11 wherein said groups of data are pixel data.

13. The apparatus of claim 12 wherein said means of dividing includes dividing said pixel data into its RGB component data.

14. The apparatus of claim 13 wherein said memory device is a frame buffer and said portions are memory banks, each memory bank for storing a component of the RGB component data.

15. The apparatus of claim 14 further comprising a data bus, said data bus being disconnected from a first memory bank and reconnected to a second memory bank after moving all RGB components stored in said first memory bank.

16. An apparatus for moving pixel data from a first area of a frame buffer to a second area, said frame buffer being divided into a plurality of data banks wherein different components of each pixel are stored in different data banks, said apparatus comprising:

means for gathering common components of all pixels to be moved from each of said different data banks; and means for moving said common components of said pixels in each data bank, from one area of said data bank to another, one data bank at a time.

17. A method of moving pixel data from a first area of a frame buffer to a second area, said frame buffer being divided into a plurality of data banks wherein different components of each pixel are stored in different data banks, said method comprising the steps of:

gathering common components of all pixels to be moved from each of said different data banks; and moving said common components of said pixels in each data bank, from one area of said data bank to another, one data bank at a time.

18. A display system comprising:

a host computer; and a graphics adapter coupled to said host computer, said graphics adapter including means for moving pixel data from a first area of a frame buffer to a second area, said frame buffer being divided into a plurality of data banks wherein different components of each pixel are stored in different data banks, said graphics adapter further including:

means for gathering common components of all pixels to be moved from each of said different data banks; and means for moving said common components of said pixels in each data bank, from one area of said data bank to another, one data bank at a time.

* * * * *